(12) United States Patent
Kawai

(10) Patent No.: US 11,153,460 B2
(45) Date of Patent: Oct. 19, 2021

(54) CONTROL METHOD, INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Yu Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 16/429,433

(22) Filed: Jun. 3, 2019

(65) Prior Publication Data

US 2019/0387128 A1  Dec. 19, 2019

(30) Foreign Application Priority Data

Jun. 14, 2018 (JP) .............................. JP2018-113846

(51) Int. Cl.
```
H04N 1/44      (2006.01)
G06F 3/12      (2006.01)
G06K 15/02     (2006.01)
H04N 1/00      (2006.01)
```
(52) U.S. Cl.
CPC ......... *H04N 1/4413* (2013.01); *G06F 3/1222* (2013.01); *G06F 3/1236* (2013.01); *G06F 3/1238* (2013.01); *G06F 3/1239* (2013.01); *G06F 3/1292* (2013.01); *G06K 15/02* (2013.01);
(Continued)

(58) Field of Classification Search
None
See application file for complete search history.

(56) References Cited

U.S. PATENT DOCUMENTS

| 2007/0201389 A1 | 8/2007 | Murayama |
| 2016/0065661 A1* | 3/2016 | Kang ................. H04N 1/00472 709/203 |
| 2016/0234301 A1* | 8/2016 | Qi ........................ H04W 8/005 |

(Continued)

FOREIGN PATENT DOCUMENTS

JP  2016187090 A  10/2016

OTHER PUBLICATIONS

European Search Report issued in corresponding European Application No. 19177052.8 dated Aug. 19, 2019.

*Primary Examiner* — Fan Zhang

(74) *Attorney, Agent, or Firm* — Venable LLP

(57) ABSTRACT

There is provided a control method of an information processing apparatus that can execute authentication processing with a communication apparatus by authentication schemes. The method includes: performing display control to cause a display unit to display a guide for performing the authentication processing with the communication apparatus in accordance with one of the authentication schemes when the information processing apparatus has obtained information from the communication apparatus; and executing the authentication processing in accordance with an operation performed by a user after the guide is displayed. In the performing the display control, a different guide is displayed in accordance with contents of the obtained information, and in the executing, the authentication processing is executed in accordance with an authentication scheme, which differs in accordance with the contents of the obtained information and corresponds to the displayed guide.

21 Claims, 11 Drawing Sheets

(52) U.S. Cl.
CPC ..... *H04N 1/00411* (2013.01); *H04N 1/00856* (2013.01)

(56) References Cited

U.S. PATENT DOCUMENTS

| | | |
|---|---|---|
| 2016/0373886 A1 | 12/2016 | Bukurak |
| 2017/0339128 A1 | 11/2017 | Lim |
| 2018/0152829 A1* | 5/2018 | Fujiwara ............... H04W 84/18 |

* cited by examiner

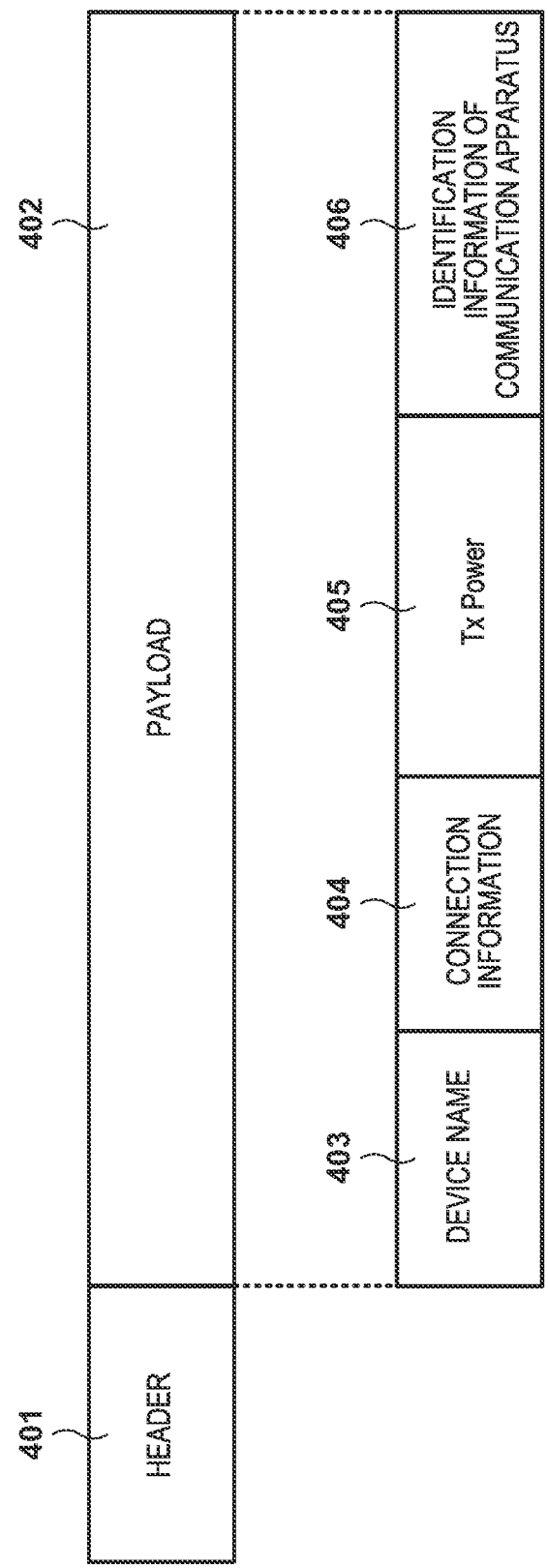

CONTROL METHOD, INFORMATION PROCESSING APPARATUS, AND NON-TRANSITORY COMPUTER-READABLE STORAGE MEDIUM

BACKGROUND OF THE INVENTION

Field of the Invention

The present invention relates to an authentication procedure performed in wireless connection between communication apparatuses.

Description of the Related Art

In recent years, there are provided services that use short range wireless communication. In Japanese Patent Laid-Open No. 2016-187090, there is disclosed a method in which a communication apparatus makes wireless LAN network settings by using BLE (Bluetooth® Low Energy) or the like as a short range wireless communication function. In Japanese Patent Laid-Open No. 2016-187090, there is also disclosed that pairing processing for establishing a Bluetooth connection is performed at the time of this setting.

A plurality of kinds of procedures can be used for pairing, and the type of pairing required to be used can change depending on the devices that are to execute the pairing. Hence, a user needs to execute pairing upon recognizing which procedure is required to execute the pairing between his/her apparatus and another pairing-target apparatus, and the convenience is problematically low. In addition, it is also possible to conceive cases in which the pairing procedure differs even between same devices due to the timing of market shipment, and thus the load for determining which procedure to use increases for the user.

SUMMARY OF THE INVENTION

An aspect of the present invention is to eliminate the above-mentioned problem with conventional technology.

A feature of the present invention is to provide a technique that improves user convenience when communication apparatuses are to be connected.

One aspect of the present invention provides a control method of an information processing apparatus that can execute authentication processing with a communication apparatus by a plurality of authentication schemes, the method comprising: performing display control to cause a display unit to display a guide for performing the authentication processing with the communication apparatus in accordance with one of the plurality of authentication schemes when the information processing apparatus has obtained information from the communication apparatus by predetermined communication; and executing the authentication processing in accordance with an operation performed by a user after the guide is displayed by the control performed in the performing the display control, wherein in the performing the display control, a different guide is displayed in accordance with contents of the obtained information, and in the executing, the authentication processing with the communication apparatus is executed in accordance with an authentication scheme, among the plurality of authentication schemes, which differs in accordance with the contents of the obtained information and corresponds to the displayed guide.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view indicating an example of the structure of advertising information;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

(System and Apparatus Arrangement)

Figure 1:
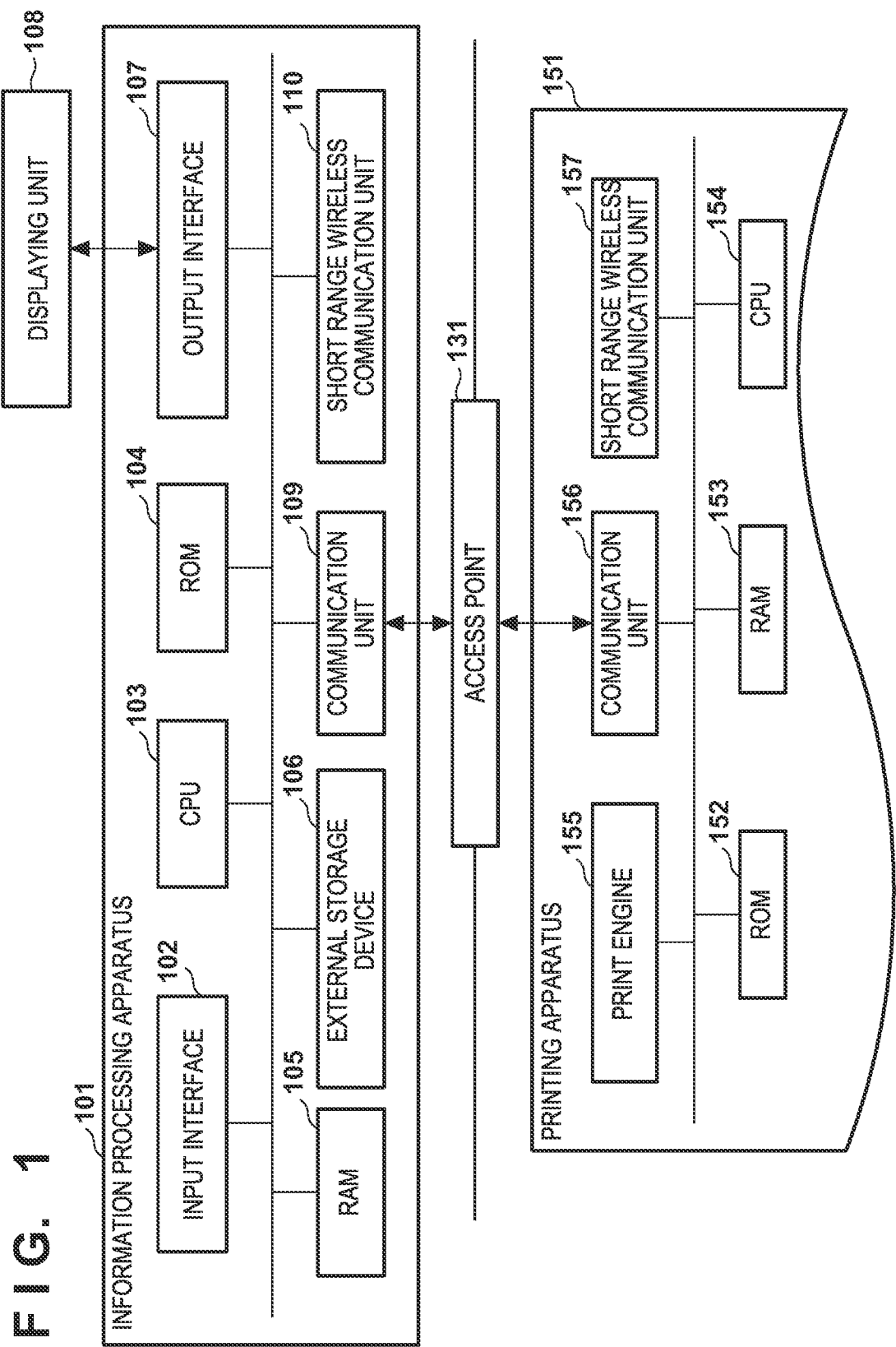
FIG. 1 is a block diagram indicating an example of the system arrangement and an example of the hardware arrangement of an apparatus.

An example of the arrangement of a system according to an embodiment will be described with reference to FIG. 1. This system is formed by an information processing apparatus 101 and a communication apparatus 151. The communication apparatus 151 is, for example, a printer, and print processing is executed when print data prepared by the information processing apparatus 101 is transmitted to the communication apparatus 151 via a network. Note that the communication between the information processing apparatus 101 and the communication apparatus 151 can be executed by, for example, a wireless LAN in compliance with IEEE 803.11 standard series via an access point 131. Note that although an embodiment based on a network arrangement using the access point 131 will be described here, another arrangement that allows the information processing apparatus 101 and the communication apparatus 151 to mutually communicate may be used. In addition, the plurality of blocks shown in FIG. 1 may be integrated into a single block, or a single block may be separated into a plurality of blocks. Furthermore, a block other than those shown in FIG. 1 may be added, or one or more blocks out of those shown in FIG. 1 may be omitted.

The information processing apparatus 101 can be, for example, a smartphone, but the present invention is not limited to this. The information processing apparatus 101 may be, for example, a personal computer (PC), a portable terminal, a notebook PC, a tablet terminal, a PDA (Personal Digital Assistant), a digital camera, or the like. The communication apparatus 151 can be, for example, a printer such as an inkjet printer, a full-color laser beam printer, a monochrome printer, or the like. However, the present invention is not limited to this, and the communication apparatus can be any of the various kinds of communication apparatuses that can wirelessly communicate with the information processing apparatus 101. The communication apparatus 151 may be, for example, a copy machine, a facsimile device, a portable terminal, a smartphone, a notebook PC, a tablet terminal, a PDA, a digital camera, a music playback device, a television, or the like. The communication apparatus 151 may also be, for example, a multifunction peripheral that has a plurality of functions such as a copy function, a FAX function, a print function, and the like.

The information processing apparatus 101 is formed by, for example, an input interface 102, a CPU 103, a ROM 104, a RAM 105, an external storage device 106, an output interface 107, a communication unit 109, and a short range wireless communication unit 110. Here, CPU, ROM, and RAM are acronyms of Central Processing Unit, Read Only Memory, and Random Access Memory, respectively. Note that although FIG. 1 indicates an example of a case in which the information processing apparatus 101 causes a display device (display unit 108) such as an external display or the to display information, the display unit 108 may be included in the information processing apparatus 101.

The input interface 102 is an interface for accepting data inputs and operation instructions from a user. The input interface 102 is formed by, for example, a physical keyboard, buttons, a touch panel, and the like. Note that the input interface 102 and the output interface 107 (to be described later) can be integrated so that a screen output and the accepting of an operation from the user can be performed by using common hardware.

The CPU 103 is a system control unit and controls the overall information processing apparatus 101. The ROM 104 stores permanent data such control programs and data tables to be executed by the CPU 103, an embedded operating system (to be referred to as an "OS" hereinafter) program, and the like. In this embodiment, each control program stored in the ROM 104 performs software execution control such as scheduling, task switching, interrupt processing, and the like under the management of the embedded OS stored in the ROM 104. The RAM 105 is formed by an SRAM (Static Random Access Memory) requiring a backup power supply. Note that since the RAM 105 holds data by a primary battery (not shown) for data backup, it can store important data such as program control variables and the like without volatilizing the data. In addition, a memory area for storing setting information and management data of the information processing apparatus 101 can be arranged in the RAM 105. The RAM 105 can also be used as the main memory and the work memory of the CPU 103.

The external storage device 106 stores an application that provides a print execution function, a print information generation program for generating print information interpretable by the communication apparatus 151, and the like. The external storage device 106 can also store various kinds of programs such as control programs for transmitting/receiving information to/from another apparatus (for example, the communication apparatus 151) which is connected via the communication unit 109 and various kinds of information to be used by these programs.

The output interface 107 is an interface that performs control for the display unit 108 to display data or to present information of the status of the information processing apparatus 101. The output interface 107 outputs, for example, control information and display target information to cause the display unit 108 to display information. The display unit 108 includes and is formed by an LED (light emitting diode), an LCD (liquid crystal display), and the like, and notifies the user of the data display and the status of the information processing apparatus 101. Note that a software keyboard including keys such as a numerical value input key, a mode setting key, a determination key, a cancellation key, a power key, and the like may be displayed on the display unit 108, and inputs from the user may be accepted via this software keyboard.

The communication unit 109 is formed by a baseband circuit for executing data communication by connecting with an external apparatus such as the communication apparatus 151, a wireless frequency (RF) circuit, and the like. For example, the communication unit 109 can communicate with the communication apparatus 151 via the access point 131 which exists separately from the information processing apparatus 101 and the communication apparatus 151. The access point 131 can be, for example, a device such as a wireless LAN router that operates in accordance with a wireless communication scheme in compliance with the IEEE 803.11 standard series. The communication unit 109 may also directly establish connection with the communication apparatus 151 in accordance with a protocol such as Wi-Fi (Wireless Fidelity) Direct®. In addition, in a case in which the communication apparatus 151 includes an access point (not shown), the communication unit 109 may directly establish connection with the communication apparatus 151 by connecting to this access point. Note that although the communication unit 109 can be formed to execute communication by Wi-Fi®, it may also perform communication by another wireless communication scheme such as Bluetooth®. Note that in this embodiment, a scheme in which the information processing apparatus 101 and the communication apparatus 151 are directly connected to each other without going through of an external access point will be referred to as a direct connection scheme. In addition, a scheme in which the information processing apparatus 101 and the communication apparatus 151 are connected to each other via an external access point will be referred to as an infrastructure connection scheme.

The short range wireless communication unit 110 establishes wireless connection with a short range wireless communication unit 157 of the communication apparatus 151 and executes data communication based on at least the fact that the communication apparatus 151 (external apparatus) has entered within its predetermined short range. Note that in this embodiment, the short range wireless communication unit 110 will perform wireless communication in compliance with the Bluetooth® Low Energy (BLE) standard. Note that a wireless communication scheme different from BLE may be used in so far as the short range wireless communication unit 110 can perform communication by using a communication scheme that is capable of executing short range wireless communication different from that of the communication unit 109.

The communication apparatus 151 is formed by, for example, a ROM 152, a RAM 153, a CPU 154, a print engine 155, a communication unit 156, and the short range wireless communication unit 157.

The communication unit 156 is formed by a baseband circuit for connecting to an external apparatus such as the information processing apparatus 101, a wireless frequency (RF) circuit, and the like. The communication unit 156 corresponds to the communication unit 109 of the information processing apparatus 101 and executes communication, for example, by a wireless communication scheme such as Wi-Fi, Bluetooth®, or the like. As described above, the communication unit 156 may, for example, directly connect to the communication unit 109 of the information processing apparatus 101 by functioning as an access point or in accordance with a predetermined protocol or may connect to the communication unit of the information processing apparatus via the external access point 131. In a case in which the communication unit 156 is to function as an access point, it may include hardware to function as an access point or use software which will allow it to function as an access point. Note that although the information processing apparatus 101 and the communication apparatus 151 are connected to one access point 131 in the example shown in FIG. 1, each apparatus may be connected to a separate access point that is connected to a network, and connect to each other via the network.

The short range wireless communication unit 157 executes, based on the fact that the information processing apparatus 101 (external apparatus) has entered inside the predetermined short range, data communication by establishing wireless communication with the short range wireless communication unit 110 of the information processing apparatus 101. The short range wireless communication unit 157 corresponds to the short range wireless communication unit 110 of the information processing apparatus 101 and performs wireless communication by a wireless communication scheme in compliance with the BLE standard in this embodiment. Note that, for example, since the data amount of the print information transmitted from the information processing apparatus 101 or the like is large and requires high-speed large-capacity communication, it can be received via the communication unit 156 which can execute communication at a higher speed than the short range wireless communication unit 157.

The RAM 153 is a memory similar to the RAM 105. A memory area for storing setting information and management data of the communication apparatus 151 is arranged in the RAM 153. The RAM 153 is also used as the main memory and the work memory of the CPU 154, functions as a reception buffer for temporarily storing the print information received from the information processing apparatus 101 or the like, and stores various kinds of information. The ROM 152 stores permanent data such as control programs and data tables to be executed by the CPU 154, an OS program, and the like. When the CPU 154 executes each control program stored in the ROM 152, software execution control such as scheduling, task switching, interrupt processing, and the like can be executed under the management of the embedded OS stored in the ROM 152. The CPU 154 is a system control unit and controls the overall communication apparatus 151. Note that a memory such as an external HDD, an SD card, or the like may be attached to the communication apparatus 151 as an optional device, and the information stored in the communication apparatus 151 may be stored in such a memory.

The print engine 155 forms an image, based on the print information received from the information stored in the RAM 153 or the information processing apparatus 101, on a print medium such as a paper sheet by using a printing agent such as ink and outputs the print result.

Note that a connection mode is set to the communication apparatus 151 according to this embodiment by connection setting processing, and the communication apparatus performs communication with the information processing apparatus 101 by the connection format based on the set connection mode. In the communication apparatus 151 according to this embodiment, in a case in which communication is to be performed by infrastructure connection, the infrastructure connection mode will be set as the connection mode, and in a case in which communication is to be performed by directly connecting, the direct connection mode is set as the connection mode.

Furthermore, the division of processes between the information processing apparatus 101 and the communication apparatus 151 described above is merely an example, and the processes may be divided in a form other than this.

In this embodiment, assume that the information processing apparatus 101 stores a predetermined application in the ROM 104, the external storage device 106, or the like. This predetermined application is an application program used to transmit print information for printing image data, document data, or the like in the information processing apparatus 101 to the communication apparatus 151. An application that has such a function will be referred to as a "printing application" hereinafter. Note that the printing application can have functions other than the printing function. For example, the printing application may have a function to cause an original set on the communication apparatus 151 to be scanned if the communication apparatus 151 has a scan function, a function to make other settings in the communication apparatus 151, a function for confirming the status of the communication apparatus 151, and the like. That is, the printing application may have a function to transmit, other than the print information, a scan job or a setting job to the communication apparatus 151. In addition, the predetermined application described above is not limited to the printing application, and may be an application program that corresponds to a function other than printing.

(Outline of Advertising)

Figure 2:
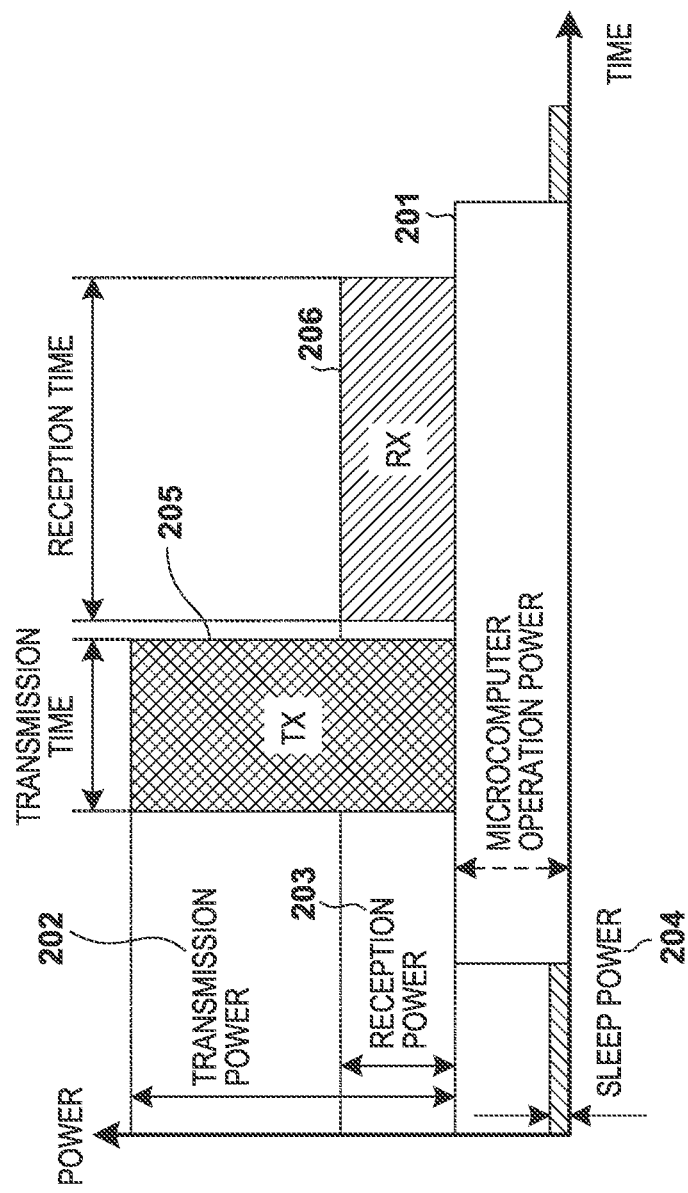
FIG. 2 is a view indicating the outline of processing for advertising information transmission and connection request information reception.

As described above, the short range wireless communication unit 110 and the short range wireless communication unit 157 communicate by BLE. In this embodiment, assume that the short range wireless communication unit 157 functions as an advertiser (or a slave) that broadcasts advertising information (to be described later) and the short range wireless communication unit 110 functions as a scanner (or a master) that receives the advertising information. The processing for advertising information transmission and BLE connection request reception according to the BLE standard will be described here. In this embodiment, the short range wireless communication unit 157 that functions as a slave device will perform this processing for advertising information transmission and BLE connection request reception. In BLE, a frequency band of 2.4 GHz is divided into 40 channels (0 to 39 ch), and communication is performed by using these channels. Note that among these channels, 37th to 39th channels are used to transmit the advertising information and to receive the BLE connection request, and 0th to 36th channels are used for data communication after the BLE connection has been established. FIG. 2 indicates the power consumption for each processing operation when advertising information is to be transmitted by using one channel. Note that in FIG. 2, the ordinate indicates the power consumption of the short range wireless communication unit 157, and the abscissa indicates the time. TX 205 indicates the total power consumption in the transmission processing which is the processing to broadcast the advertising information. Also, RX 206 indicates the total power consumption in the reception processing which is the processing performed to enable a reception device to receive the BLE connection request. In this manner, after the transmission processing (TX 205) has been performed by using a predetermined channel, the short range wireless communication unit 157 waits for the BLE connection request to be transmitted from the information processing apparatus 101 by performing the reception processing (RX 206) over a predetermined time by using the same channel. A transmission power 202 indicates the instantaneous power consumption by the transmission processing. Also, reception power 203 indicates the instantaneous power consumption by the reception processing. In addition, microcomputer operation power 201 indicates the instantaneous power consumption when a microcomputer in the short range wireless communication unit 157 is operating. Note that since the microcomputer needs to be activated to execute or stop the signal transmission and reception processing operations, it is set so that the microcomputer will operate before and after the periods of TX 205 and RX 206 as well as during these periods. Also, in a case in which the advertising information transmission is to be performed by a plurality of channels, the power consumption will increase in accordance with the number of channels which are to perform advertising information transmission and wait for the BLE connection request reception. In addition, while the microcomputer is not operating and the short range wireless communication unit 157 is in a power saving state, the instantaneous power consumption is suppressed to sleep power 204.

Figure 3:
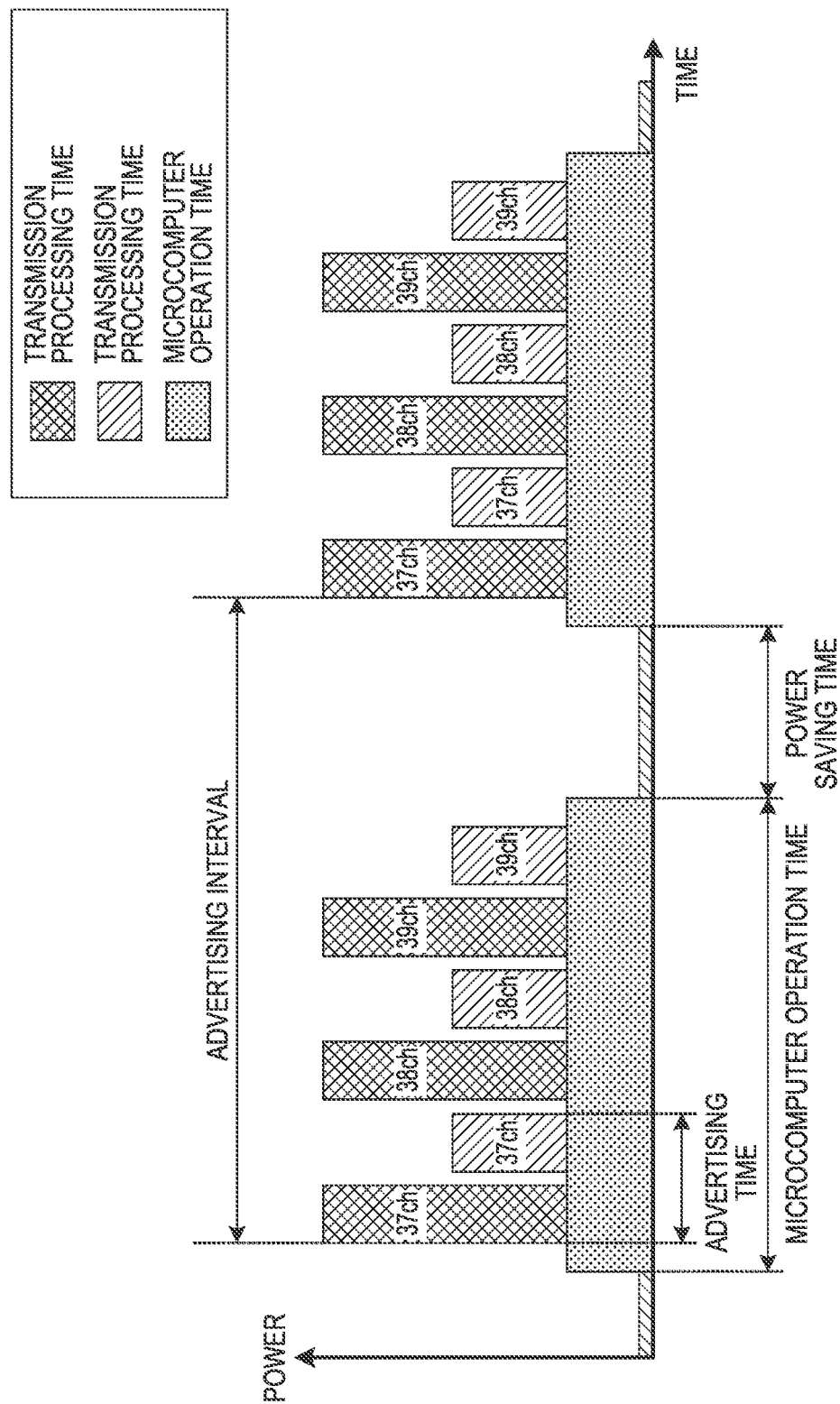
FIG. 3 is a view indicating the outline of advertising processing in BLE.

In addition, the short range wireless communication unit 157 will shift to a power saving state for a predetermined time as shown in FIG. 3 by stopping the operation of the microcomputer after repeating the advertising information transmission processing and the reception processing once for each of the three channels, that is, a total of three times. The combination of the advertising information transmission processing and the BLE connection request reception processing performed by using a predetermined channel will be referred to as advertising hereinafter. In addition, the time interval after the advertising information has been transmitted from a predetermined channel until the next advertising information transmission from the predetermined channel will be referred to as an advertising interval. Note that the number of advertising information pieces to be repeated transmitted from the first advertising information transmission until the power saving state can be set to an arbitrary number equal to or less than 3.

FIG. 4 indicates an example of the structure of advertising information that is broadcast by the short range wireless communication unit 157 to the periphery of the communication apparatus 151.

The short range wireless communication unit 157 executes initialization processing when power supply is started and changes to an advertising state. After changing to the advertising state, the short range wireless communication unit 157 broadcasts the advertising information periodically to its periphery at a cycle corresponding to the advertising interval. The advertising information is a signal including basic header information (identification information or the like for identifying the apparatus transmitting the advertising information) and is formed by a header 401 and a payload 402. The information processing apparatus 101 can recognize the presence of the communication apparatus 151 by receiving this advertising information. In addition, the information processing apparatus 101 can establish a BLE connection with the communication apparatus 151 by transmitting a BLE connection request to the communication apparatus 151 based on the information of the communication apparatus 151 obtained from the advertising information. The header 401 is a region for storing the PDU (Protocol Data Unit) type and the information of the size of the payload 402 of the advertising information. The short range wireless communication unit 110 can issue a scan request (SCAN_REQ) to the short range wireless communication unit 157 when the PDU type is ADV_IND or ADV_SCAN_IND. Upon receiving the scan request, the short range wireless communication unit 157 transmits scan response information (SCAN_RSP) as a response to the scan request. By receiving the scan response information via the short range wireless communication unit 110, the information processing apparatus 101 can further obtain information in addition to information that can be obtained from the advertising information from the communication apparatus 151. The payload 402 stores information such as a device name 403 as the identification information, installed profile information, connection information 404 for establishing BLE connection with the communication apparatus 151, advertising information transmission power (TX power) 405, and the like. Note that identification information 406 of the communication apparatus 151 may be included in the advertising information. The identification information 406 of the communication apparatus 151 includes, for example, the MAC address of the communication apparatus 151. In addition, the identification information 406 of the communication apparatus 151 may include the service information of the communication apparatus 151, the pairing scheme supported by the communication apparatus 151, information indicating whether the communication apparatus 151 includes an operation panel (operation screen), an SSID of the access point in the communication apparatus 151, a password, and the like. The scan response information basically has the same structure as the advertising information. Note that the PDU type included in the header 401 of the scan response information is SCAN_RSP, and the information stored in the payload 402 can be information different from the advertising information as needed. Note that the pairing scheme supported by the communication apparatus 151 can be Numeric Comparison, Just Works, or Passkey Entry. Numeric Comparison is a pairing method that performs correspondence confirmation by displaying, for example, a predetermined digit (for example, a 6-digit) code and can be used by a device that has a display function. Just Works is a pairing method that neither displays nor confirms such a code and can be used by a device that does not have a display function and does not allow code input. Passkey Entry is a pairing method by code input and can be used in a device that does not have a display function but has a code input function. Note that, since pairing processing is performed by executing authentication processing by using a PIN code (as will be described later) in Numeric Comparison or the like, the pairing processing may be referred to as authentication processing. Also, since the PIN code is used as authentication information, it may be referred to as authentication information. The operation panel that can be included in the communication apparatus 151 is a touch panel or a liquid crystal display in one example, but it may be an operation panel other than these.

In this embodiment, the short range wireless communication unit 157 will start the advertising information transmission by changing to an advertising state when the communication apparatus 151 is powered on. However, the timing at which the short range wireless communication unit 157 starts the advertising information transmission is not limited to this, and for example, the advertising information transmission may be started in accordance with the timing at which a predetermined operation to enable the BLE function has been performed.

Note that in a case in which the short range wireless communication unit 157 transmits first advertising information and receives a response (scan request) to the information from the information processing apparatus 101, it may be set so that second advertising information having contents different from the first advertising information will be transmitted. The second advertising information in this case can be referred to as scan response information. The first advertising information here includes at least one of, for example, the IP address of the communication apparatus 151, the port to be used in the printing operation, the information indicating a specific printing service, the information related to the advertising information transmission power, and the identification information of the short range wireless communication unit 157. In addition, the second advertising information can include at least one of, for example, the identification information (UUID) of the communication apparatus 151 and the information related to functions and hardware of the communication apparatus 151 (for example, operation panel information indicating whether the apparatus includes the operation panel described above). By configuring the advertising information in this manner, the printing application, for example, can be designed to handle the second advertising information. In the following description, assume that the advertising information handled by the printing application is the second advertising information. Note that the first advertising information and the second advertising information can include information other than the information described above.

(Outline of Pairing Processing)

In this embodiment, authentication is performed between the information processing apparatus 101 and the communication apparatus 151, and pairing processing for permitting transmission/reception of specific data is executed by GATT (Generic Attribute Profile) communication. Note that GATT is a profile governing the transmission/reception of information in the BLE standard. In the GATT communication, the information processing apparatus 101 and the communication apparatus 151 operate as a GATT client and a GATT server, respectively, and information is transmitted from the information processing apparatus 101 to the communication apparatus 151 by using a GATT-based profile. In this case, the communication apparatus 151 will not permit the transmission/reception of information by the GATT communication in a state without the execution of the pairing with the information processing apparatus 101. This can prevent, for example, a state in which the information from the communication apparatus 151 is received by an apparatus which has not performed pairing with the communication apparatus 151, and thus prevent a state in which the information held by the communication apparatus 151 is accidentally obtained by such an apparatus. Note that there can be GATT communication which is permitted in a state without a pairing processing and GATT communication which is not permitted in a state without a pairing processing. For example, the convenience of communication can be improved by allowing low sensitivity information to be communicated by GATT communication that is permitted in a state without the pairing processing. On the other hand, the security of communication can be improved by allowing high sensitivity information to be communicated by only GATT communication that is not permitted in a state without the pairing processing. Note that although high sensitivity information can include, for example, the status information or the setting information of the communication apparatus 151, information other than these pieces of information can be included.

Figure 5A:
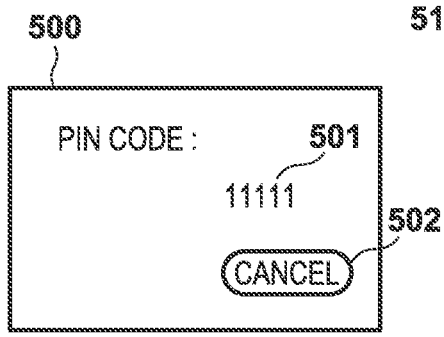
FIGS. 5A and 5B are views indicating examples of screens related to pairing processing using a Numeric Comparison scheme.
Figure 5B:
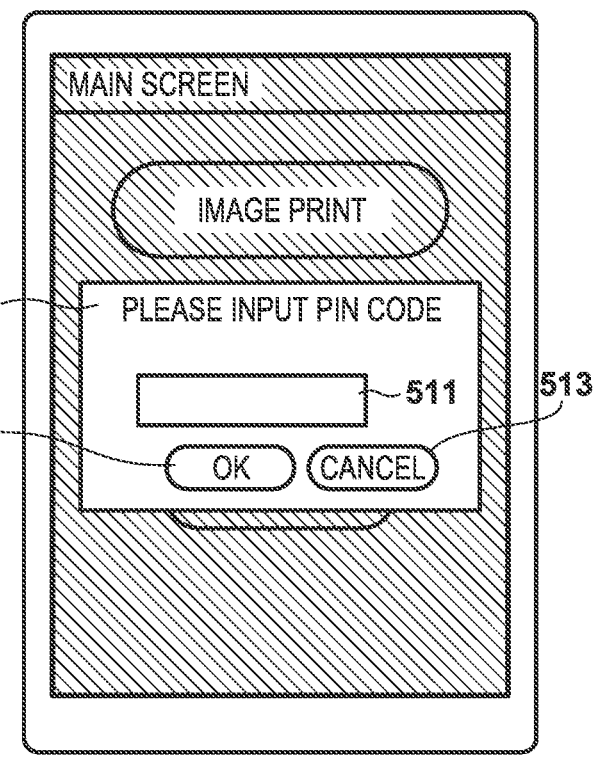

The details of the pairing processing will be described. First, when the printing application described above is activated and a pairing processing execution instruction has been received from the user via the printing application, the information processing apparatus 101 starts the search for the advertising information that includes specific apparatus information. Note that specific apparatus information is, for example, a UUID, a MAC address, or the like of an apparatus (a printer or the like) corresponding to the printing application. Subsequently, upon receiving the advertising information including the specific apparatus information, the information processing apparatus 101 displays a list of apparatuses which are transmission sources of the advertising information including the specific apparatus information on the display unit and accepts the selection of a pairing target apparatus made by the user. Assume that the communication apparatus 151 has been selected here. Subsequently, after accepting the selection of the pairing target apparatus, the information processing apparatus 101 transmits a pairing request to the communication apparatus 151 by executing communication under the security manager protocol (SMP). Note that the communication between the apparatuses is performed by SMP until the pairing is completed. In a case in which Numeric Comparison is employed as the pairing scheme, the communication apparatus 151 will display a PIN code display screen 500 as indicated in FIG. 5A on the operation panel upon receiving the pairing request. A PIN code 501 and a cancel button 502 for canceling the pairing processing are displayed on the PIN code display screen 500. On the other hand, when the information processing apparatus 101 has transmitted the pairing request, it will cause the display unit 108 to display a PIN code input screen 510 as indicated in FIG. 5B. A PIN code input region 511 for accepting the PIN code input by the user is displayed on the PIN code input screen 510. In addition, an OK button 512 for transmitting the input PIN code to the communication apparatus 151 and a cancel button 513 for canceling the pairing processing are displayed. When the OK button 512 is pressed in a state in which the PIN code has been input to the PIN code input region 511, the information processing apparatus 101 will transmit the information including the input PIN code to the communication apparatus 151. The communication apparatus 151 determines whether the PIN code included in the received information matches the PIN code 501 displayed on the PIN code display screen 500. If it is determined that the PIN codes match, the communication apparatus permits the pairing with the information processing apparatus 101. For example, the communication apparatus 151 will exchange a link key, which is generated by a predetermined method based on the PIN code 501, with the information processing apparatus 101 by using SMP complying with the BLE standard. The exchanged link key is stored in each of the storage area (the ROM 104 or the like) in the information processing apparatus 101 and the storage area (the ROM 152 or the like) in the communication apparatus 151. The pairing is completed as a result, and BLE communication is subsequently permitted between the apparatuses. Note that the communication apparatus 151 will display the original screen again by stopping the display of the PIN code display screen 500 when the pairing has been completed.

When transmitting a GATT communication request to the communication apparatus 151 after the completion of the pairing, the information processing apparatus 101 notifies the communication apparatus 151 of the link key which was stored in the storage area during the pairing processing. Upon receiving the GATT communication request, the communication apparatus 151 compares the link key in the notification with the link key stored in the storage area during pairing processing and confirms that the GATT communication request transmission source apparatus is a paired apparatus. Subsequently, upon confirming that the transmission source apparatus of the GATT communication request is a paired apparatus, the communication apparatus 151 starts to exchange information with the apparatus (the information processing apparatus 101) by GATT communication. As a result, once the pairing processing with the communication apparatus 151 has been completed, the information processing apparatus 101 can execute GATT communication with the communication apparatus 151 without PIN code input by the user.

Note that the PIN code input screen 510 displayed by the information processing apparatus 101 need not be displayed by the printing application. For example, the information processing apparatus 101 may include an application for setting (to be referred to as a "setting application" hereinafter). The setting application is, for example, an application program for making settings related to functions that are executed by the OS. For example, the setting application can be installed together with the OS during a series of processes in which the OS is installed to the information processing apparatus 101 or be installed in advance together with the OS at the shipment of the information processing apparatus 101. In a case in which a pairing instruction is input by the printing application, the information processing apparatus 101 will, for example, activate the setting application and cause the printing application to shift to a background operation state. The information processing apparatus 101 may accept inputs for pairing that are made by the user on a Bluetooth setting screen displayed by the setting application.

Figure 6A:
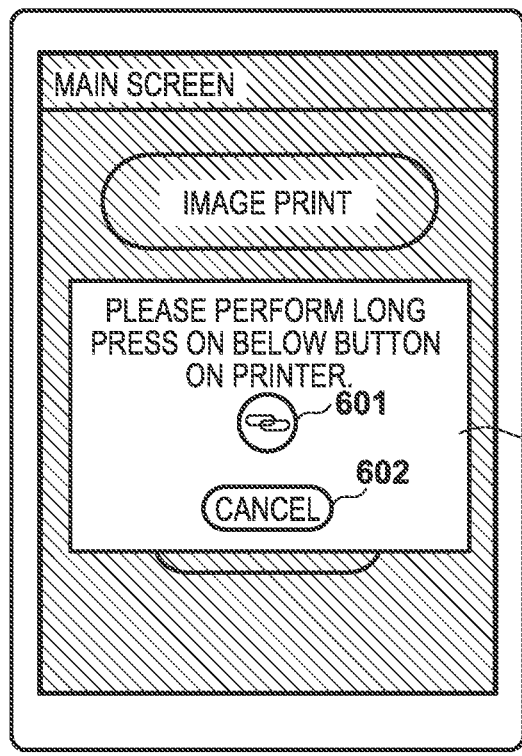
FIGS. 6A and 6B are views indicating examples of screens related to pairing processing using a Just Works scheme.
Figure 6B:
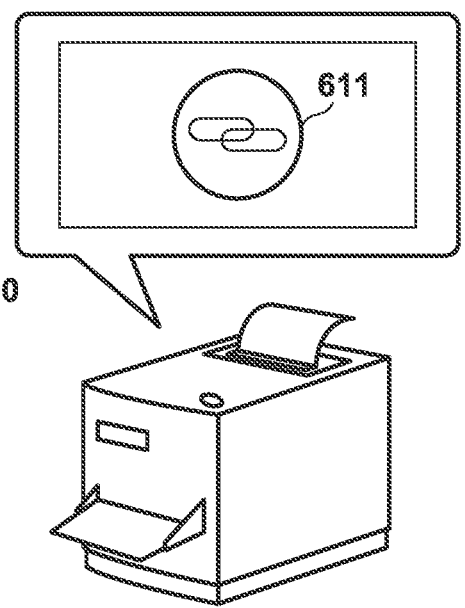

PIN code input is not required for link key exchange in a case in which Just Works is used as the pairing scheme of the communication apparatus 151. In this case, after the pairing processing is started, the information processing apparatus 101 will cause the display unit 108 to display a guide 600 as indicated in FIG. 6A. The guide 600 will display the pairing execution method and an authentication button guide 601 included in the communication apparatus 151. In addition, a cancel button 602 for canceling the pairing is also displayed. When an authentication button 611 included in the communication apparatus 151 as indicated in FIG. 6B is long-pressed, the communication apparatus 151 will notify the information processing apparatus 101 of a PIN code. Subsequently, the information processing apparatus 101 will exchange a link key, which is generated based on the PIN code obtained from the notification, with the communication apparatus 151 to complete the pairing. Note that the link key generation method here need not be based on the PIN code obtained from the notification by the operation of the communication apparatus 151. For example, the PIN code may be set as permanent information (which cannot be arbitrarily changed by the user) and stored in the information processing apparatus 101 together with the installation of the printing application. In this case, the information processing apparatus 101 can generate a link key by using this PIN code without having to accept a PIN code input from the user. Also, the timing at which the pairing processing is started is not limited to the form described above, and the pairing processing can be started at, for example, a timing at which the user made a print instruction via the printing application, a timing before BLE connection is executed in the connection setting processing, or the like. In addition, an operation method guide for the user such as the guide 600 need not be displayed by the printing application. For example, an operation method guide may be displayed on the operation panel of the communication apparatus 151 at a timing at which the information processing apparatus 101 starts the pairing processing.

(Processing Procedure)

Figure 7:
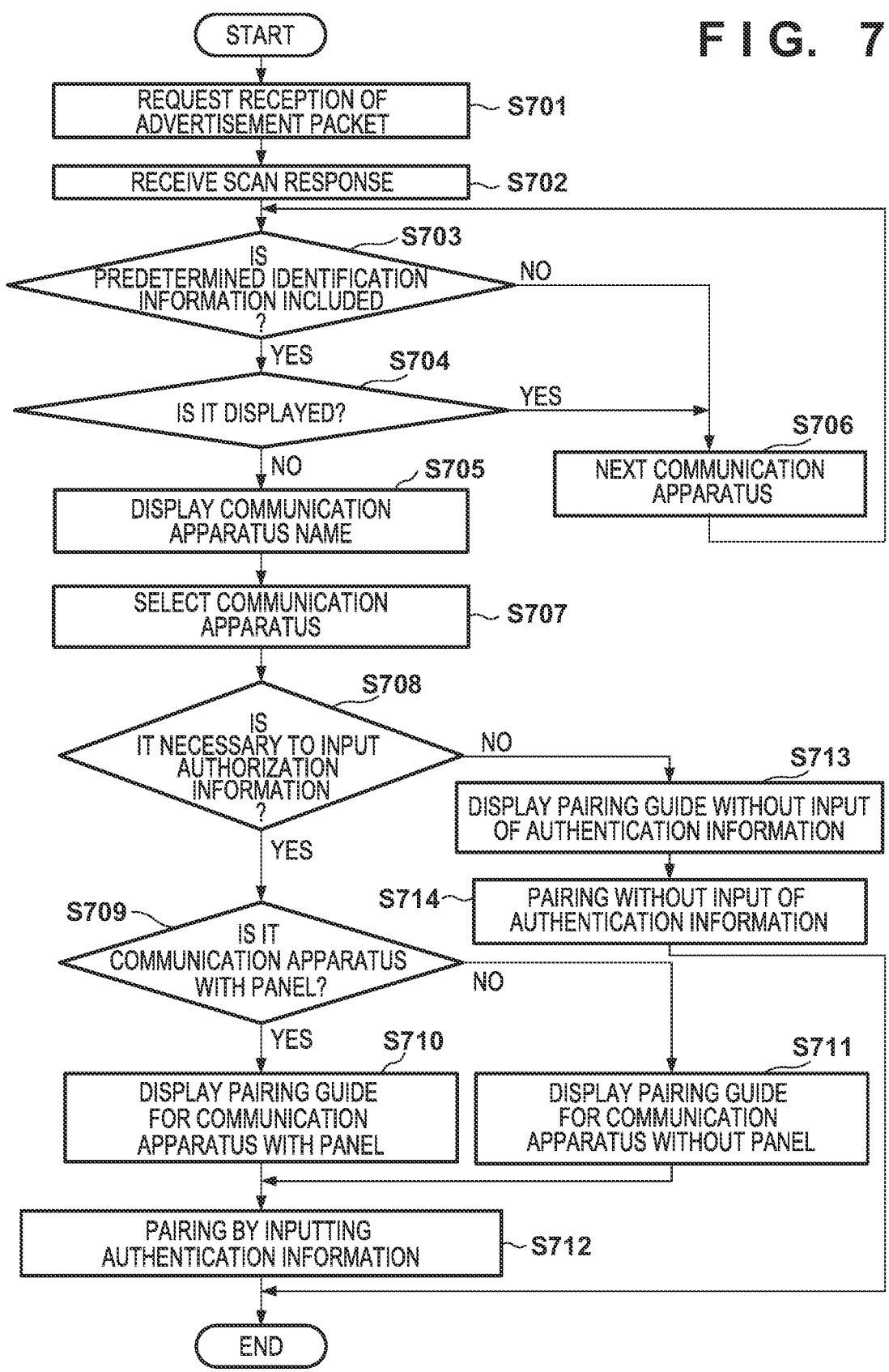
FIG. 7 is a flowchart indicating an example of the procedure of pairing procedure guide display processing.

In this embodiment, the information processing apparatus 101 will switch the pairing processing based on the pairing scheme and the operation panel information included in the scan response information of the communication apparatus 151. The information processing apparatus 101 will subsequently present an appropriate guide for assisting the pairing processing to the user. The procedure of this processing will be exemplified hereinafter. FIG. 7 is a view indicating an example of the processing procedure of the information processing apparatus 101 according to this embodiment. Note that the processing indicated in FIG. 7 is implemented by, for example, the CPU 103 reading out information necessary for the processing of the flowchart from the RAM 105 and executing the information.

Figure 8A:
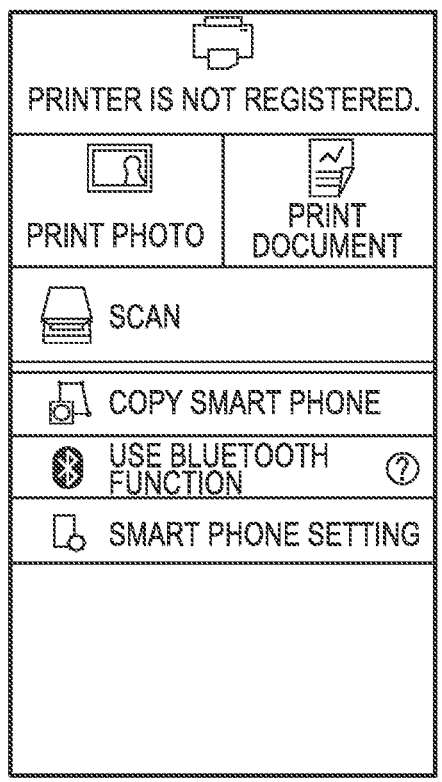
FIGS. 8A to 8K are views indicating examples of screens displayed in an information processing apparatus.
Figure 8B:
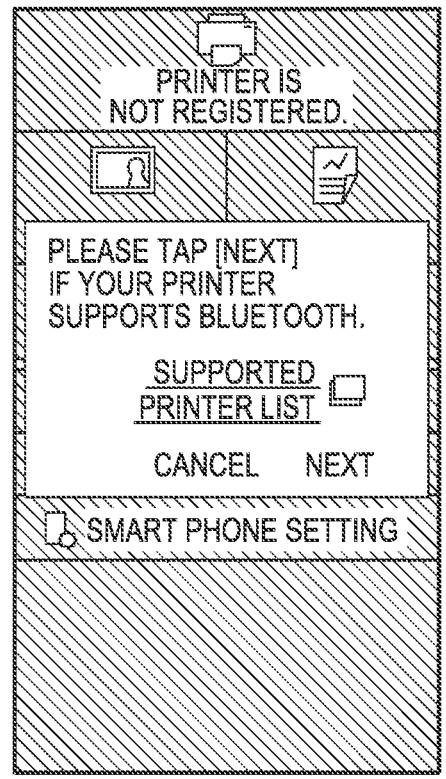
Figure 8C:
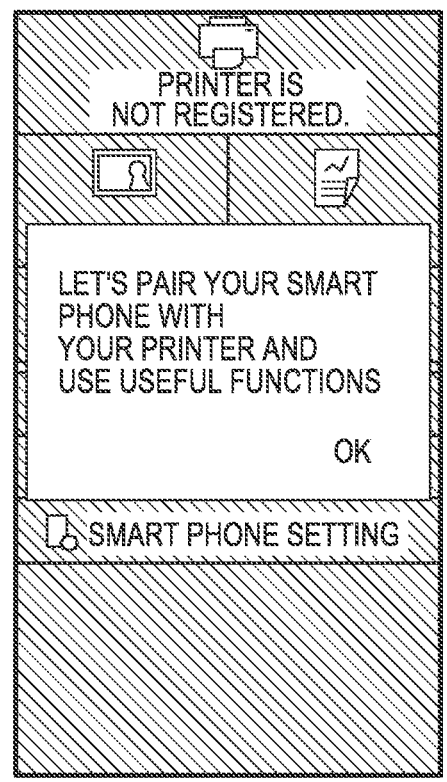
Figure 8D:
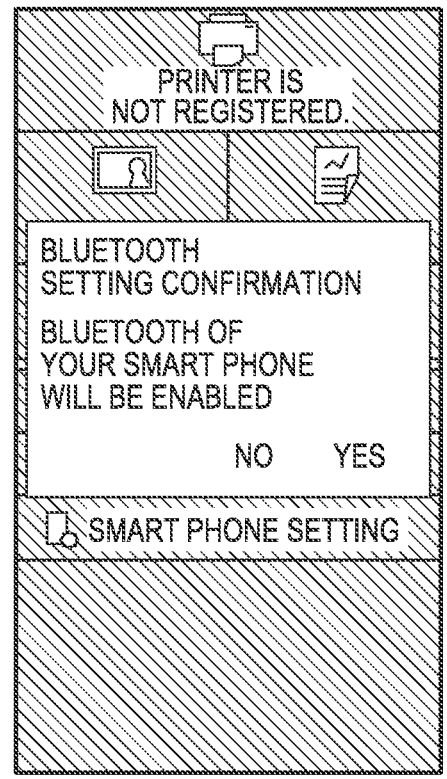
Figure 8E:
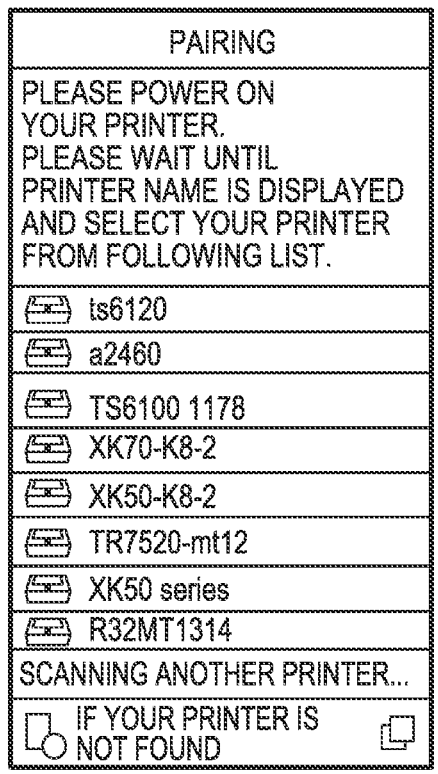
Figure 8G:
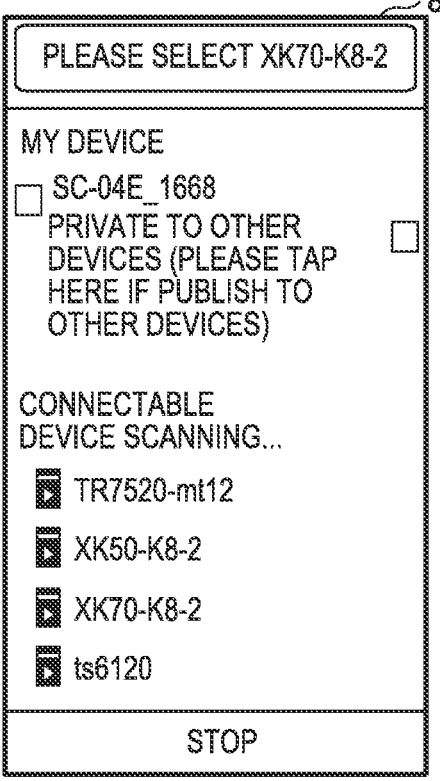
Figure 8F:
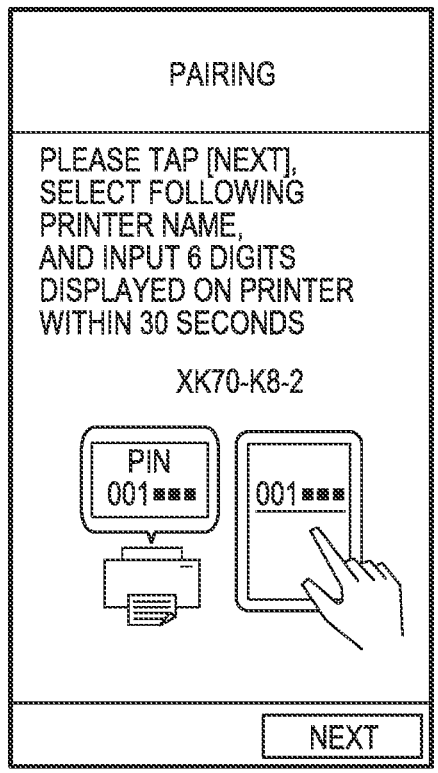
Figure 8H:
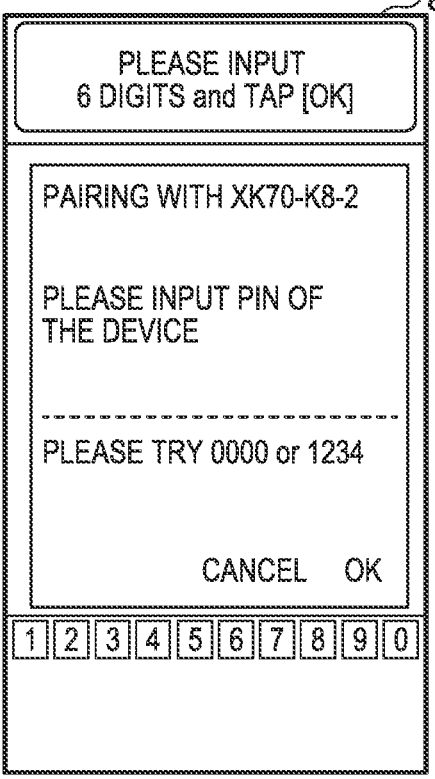
Figure 8I:
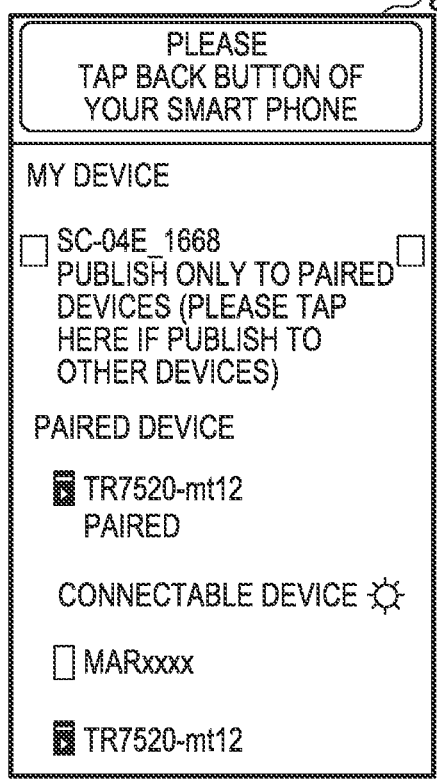

Before and during the processing of FIG. 7, screens as shown in FIGS. 8A to 8K are displayed in the information processing apparatus 101. FIGS. 8A to 8F and FIGS. 8J and 8K are examples of screens provided by the printing application, and FIGS. 8G to 8I are examples of Bluetooth setting screens provided by the setting application. First, when the printing application is activated in response to user instruction, the information processing apparatus 101 displays the screen shown in FIG. 8A as the initial screen of the printing application. When the user selects "Use Bluetooth function" in FIG. 8A, the screen shown in FIG. 8B is displayed, and the screen shifts to the screen shown in FIG. 8C when "Next" is pressed in FIG. 8B. If Bluetooth has been enabled in the information processing apparatus 101 before the "OK" button is pressed in the screen shown in FIG. 8C, the screen shown in FIG. 8E is displayed by the execution of the processing indicated in FIG. 7 (to be described later) and FIG. 8D is not displayed. On the other hand, if Bluetooth has not been enabled in the information processing apparatus 101 before the "OK" button is pressed in the screen shown in FIG. 8C, the screen shown in FIG. 8D is displayed. If "YES" is selected on the screen shown in FIG. 8D, the screen shown in FIG. 8E is displayed by the execution of the processing indicated in FIG. 7 (to be described later). The information processing apparatus 101 starts the processing of FIG. 7 when Bluetooth has been enabled.

In the processing of FIG. 7, first, the CPU 103 will request (step S701) the OS to receive advertising information (first advertising information) from the communication apparatus 151. Upon receiving this request, the OS will start the processing to receive the first advertising information issued from communication apparatuses present in the periphery of the information processing apparatus 101. In this first advertising information, ADV_IND or ADV_SCAN_IND permitting a scan request to the communication apparatus 151 is designated as the PDU type. In response to receiving the first advertising information of the PDU type permitting the scan request, the OS will issue a scan request to the communication apparatus (the communication apparatus 151) that transmitted this first advertising information. Upon receiving this scan request, the communication apparatus that transmitted the first advertising information will transmit the scan response information, and the information processing apparatus 101 will receive this scan response information. Note that, in a case in which pieces of first advertising information have been transmitted from a plurality of communication apparatuses, the information processing apparatus 101 will transmit a scan request to each of the communication apparatuses and receive scan response information from each apparatus.

The CPU 103 notifies (step S702) the printing application of the obtained advertising information (first advertising information) and the scan response information and determines (step S703) whether the scan response information includes predetermined identification information. The predetermined identification information here includes, for example, information indicating a specific print service or the like. If it is determined that the scan response information includes the predetermined identification information (YES in step S703), the CPU 103 determines (step S704) whether the name of the communication apparatus that transmitted the scan response information is displayed on the screen of the printing application shown in FIG. 8E. If the communication apparatus which is the transmission source of the scan response information including the predetermined identification information is not displayed on the screen of the printing application (NO in step S704), the CPU 103 will display (step S705) the name of the communication apparatus on the screen of the printing application. If it is determined that the scan response information does not include the predetermined identification information (NO in step S703) or if the communication apparatus which is the transmission source of the scan response information including the predetermined identification information is displayed on the screen of the printing application (YES in step S704), the process advances to step S706. In step S706, the CPU 103 changes, among the pieces of scan response information received in step S702, the scan response information to be the determination target in step S703 and subsequent steps into information that has been issued by a communication apparatus that has not undergone the determination, and returns the process to step S703. Note that although the process of step S707 is performed after the process of step S705 in this example, it may be set so that the process will not be shifted to step S707 until the determination and name display in steps S703 and S704 have been performed for all of the pieces of scan response information received in step S702. In addition, the processes such as determination and the like of steps S703 and S704 may be performed in parallel while shifting the process to step S707.

By these processes, the CPU 103 can display each communication apparatus that transmitted the scan response information including the predetermined identification information without overlap on the screen of the printing application. Note that a screen, as shown in FIG. 8E, in which pairing processing candidate communication apparatuses are listed is displayed by the process of step S705. The CPU 103 links the scan response information, transmitted by the communication apparatus set as the display target, with the identification information 406 of the communication apparatus and stores the linked pieces of information in the RAM 105. Note that in a case in which "If the printer cannot be found" is selected by the user in FIG. 8E, the CPU 103 will activate, for example, a web browser and display a web manual. This web manual can include information such as matters to be confirmed in relation to the communication apparatus that is to be a search target. In the screen shown in FIG. 8E, the CPU 103 will accept the selection of the pairing target communication apparatus by the user from the list of the communication apparatuses displayed in step S705. Subsequently, the CPU 103 selects (step S707) the communication apparatus selected by the user as the pairing target communication apparatus.

The CPU 103 reads out, from the RAM 105, the scan response information corresponding to the communication apparatus selected in step S707. Subsequently, the CPU 103 confirms the information related to the pairing scheme included in the scan response information that has been read out, and determines (step S708) whether the authentication information needs to be input. This information is expressed by, for example, a binary value indicating either "Numeric Comparison" or "Just Works". In a case in which information indicating "Numeric Comparison" is included in the scan response information, the CPU 103 will determine that the authentication information needs to be input (YES in step S708), and the process advances to step S709. On the other hand, in a case in which information indicating "Just Works" is included in the scan response information, the CPU 103 will determine that the authentication information need not be input (NO in step S708), and the process advances to step S713.

In step S709, the CPU 103 confirms information related to the presence/absence of an operation panel which is included in the scan response information that has been read out. This information is expressed by a binary value indicating, for example, either "the presence of an operation panel" or "the absence of an operation panel". If information indicating "the presence of an operation panel" is included in the scan response information (YES in step S709), the CPU 103 advances the process to step S710. If information indicating "the absence of an operation panel" is included (NO in step S709), the process advances to step S711. The CPU 103 will display, via the display unit 108, the pairing procedure for a printer that includes the operation panel in step S710. On the other hand, the CPU will display, via the display unit 108, the pairing procedure for a printer that does not include the operation panel in step S711.

Figure 9:
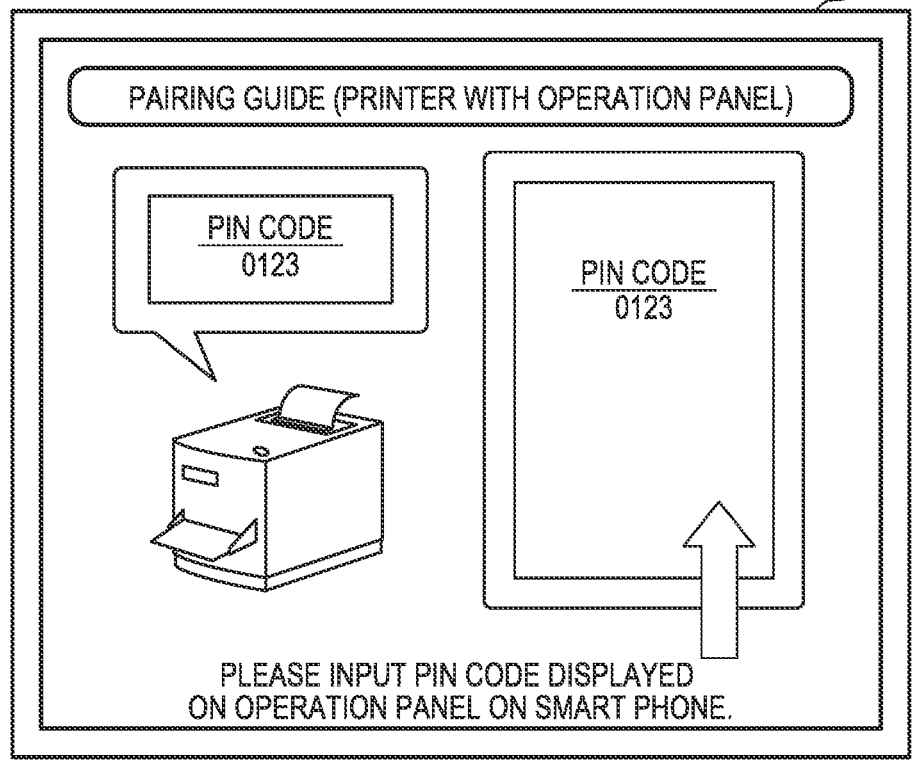
FIG. 9 is a view indicating an example of a pairing procedure guide of a printer that includes an operation panel.

FIG. 9 indicates an example of a pairing procedure guide screen, which is displayed in step S710, for a printer that includes an operation panel. In this example, a screen 901 indicating a PIN code is displayed on the operation panel of the communication apparatus 151. The user will input the PIN code displayed on the operation panel of the communication apparatus 151 via the input interface 102 of the information processing apparatus 101. As a result, it becomes possible to execute the pairing processing of the information processing apparatus 101 and the communication apparatus 151. A description of this procedure is displayed in the screen 901 shown in FIG. 9. Note that the screen shown in FIG. 8G may be displayed after a predetermined time has elapsed since the screen 901 of FIG. 9 was displayed. Also, a screen such as that shown in FIG. 8F may be displayed instead of the screen 901 of FIG. 9. If the screen shown in FIG. 8F is displayed, the screen shown in FIG. 8G will be displayed when "Next" is selected by the user. By displaying a screen such as that shown in FIG. 9, the PIN code will be displayed on the operation panel of the communication apparatus 151 and the user of information processing apparatus 101 will be able to confirm that this PIN code needs to be input to the information processing apparatus 101. Hence, the user of the information processing apparatus 101 can easily complete the pairing of the information processing apparatus 101 and the communication apparatus 151 without needing to check the pairing procedure supported by the communication apparatus 151.

Figure 8K:
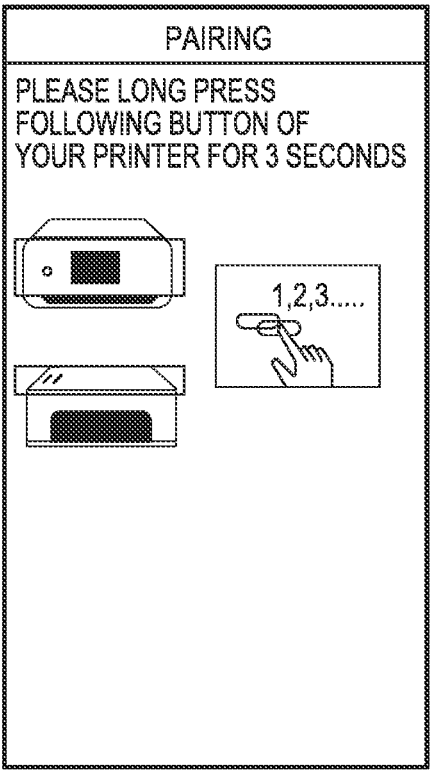
Figure 8J:
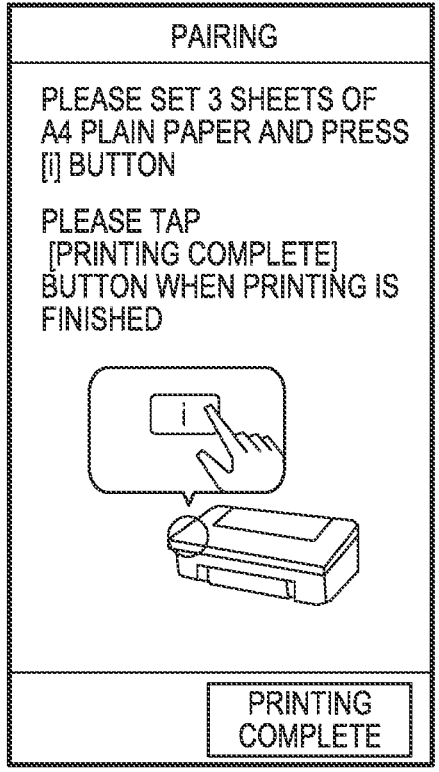
Figure 10:
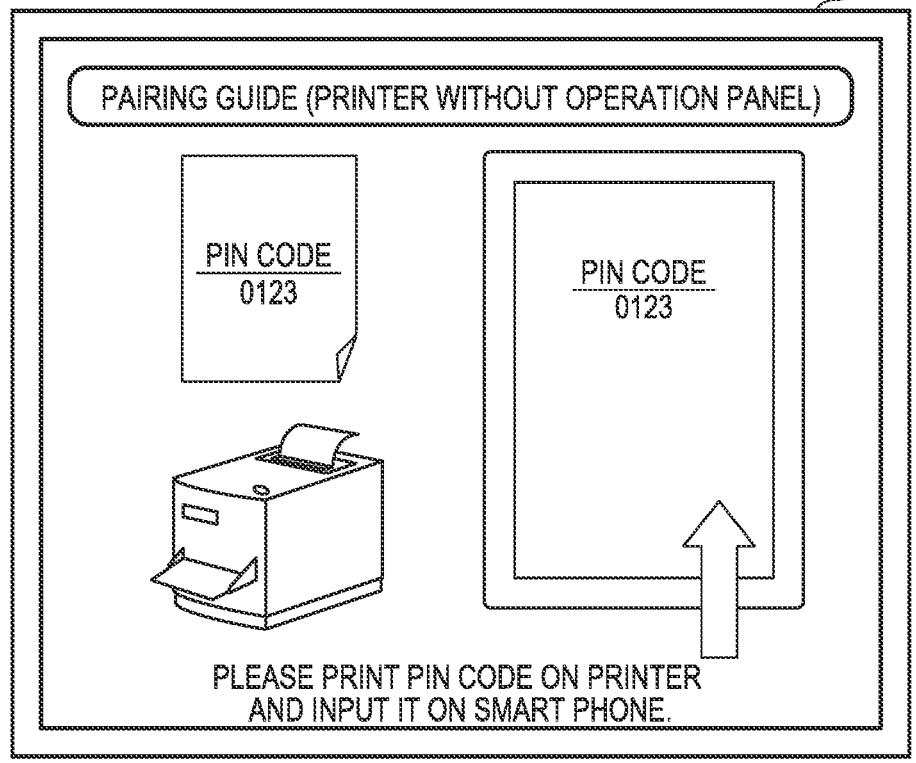
FIG. 10 is a view indicating an example of a pairing procedure guide of a printer that does not include an operation panel.

FIG. 10 shows an example of a pairing procedure guide screen, which is displayed in step S711, for a printer that does not include an operation panel. In this example, the PIN code will be output as a printed product via the print engine 155 included in the communication apparatus 151. The user can input the PIN code, printed on the printed product, via the input interface 102 of the information processing apparatus 101, and execute pairing processing of the information processing apparatus 101 and the communication apparatus 151. A description of this procedure is displayed on a screen 1001 shown in FIG. 10. The screen shown in FIG. 8G may be displayed after a predetermined time has elapsed since the screen 1001 of FIG. 10 has been displayed. Also, a screen such as that shown in FIG. 8J may be displayed instead of the screen 1001 of FIG. 10. "Sheet size", "sheet count", and "information indicating which button of the communication apparatus is to be pressed" are displayed in the screen shown in FIG. 8J. If the screen of FIG. 8J is displayed, the screen shown in FIG. 8G will be displayed when the user selects "printing complete". Note that at least the PIN code necessary for the pairing processing will be printed on the printed product which is to be printed when the user operates the communication apparatus 151 in accordance with the instruction displayed on the screen shown in FIG. 8J. However, information other than the PIN code may be printed instead of or in addition to this PIN code. By displaying a screen such as that shown in FIG. 10, the user of the information processing apparatus 101 can cause the communication apparatus 151 to print and output the PIN code, and confirm that the PIN code needs to be input to the information processing apparatus 101. Hence, the user of the information processing apparatus 101 can easily complete the pairing of the information processing apparatus 101 and the communication apparatus 151 without needing to check the pairing procedure supported by the communication apparatus 151.

Note that the PIN code notification method is not limited to the method of outputting the PIN code as a printed product, and for example, a method of notifying the user of the PIN code by audio may be used. Note that the information processing apparatus 101 may obtain, for example, information indicating whether the communication apparatus 151 has an audio output function by the scan response, and execute display control for displaying an operation guide screen for implementing the audio output based on the information. That is, the information processing apparatus 101 can obtain information of the information presentation capabilities (the presence/absence of an operation panel, the presence/absence of an audio output function, the presence/absence of a print function, and the like) of the communication apparatus 151, and execute the display control for displaying an operation guide related to the PIN code notification corresponding to the information.

A message 801 is overlaid and displayed on the Bluetooth setting screen provided by the setting application of FIG. 8G. This message 801 is generated and displayed based on, for example, the communication apparatus (communication apparatus 151 for example) selected on the screen shown in FIG. 8E by the printing application, for example. A screen shown in FIG. 8H is displayed when the user selects a communication apparatus on the screen shown in FIG. 8G.

FIG. 8H indicates an example of a screen displayed when the user selects the communication apparatus 151 corresponding to the message 801 on the screen of FIG. 8G. The PIN code input screen of FIG. 8H accepts the input of the PIN code displayed on the operation panel of the communication apparatus 151 or the PIN code described on the printed product printed by the communication apparatus 151. The pairing processing between the information processing apparatus 101 and the communication apparatus 151 is executed (step S712) when the OK button is pressed after the PIN code is input on the screen shown in FIG. 8H. Note that a message 802 is overlaid and displayed on the screen provided by the setting application shown in FIG. 8H. This message 802 is also generated and displayed by, for example, the printing application. For example, the printing application will display the message 802 as shown in FIG. 8H when it is detected that the pairing target communication apparatus has been selected in FIG. 8G.

FIG. 8I is displayed when the pairing processing by the Numeric Comparison scheme is completed. Note that a message 803 is overlaid and displayed on the screen provided by the setting application shown in FIG. 8I. The message 803 is also generated and displayed by, for example, the printing application. For example, upon detecting that the pairing has been completed, the printing application will display the message 803 as shown in FIG. 8I. For example, the printing application that had been shifted to the background is displayed again when the user selects the message 803.

In step S713, the CPU 103 displays a guide for pairing without the input of authentication information. FIG. 8K is an example of a pairing procedure guide screen for performing pairing without the input of authentication information that is displayed in step S713. In this example, a guide indicating that an authentication button for pairing included in the printer needs to be long-pressed is displayed on the display unit 108 of the information processing apparatus 101. The pairing processing is executed (step S714) when the authentication button of the communication apparatus 151 is long-pressed in accordance with this guide. Note that the pressing of the authentication button is not limited to long pressing and may be a predetermined pressing method other than long pressing such as short pressing, multiple pressing, or the like. In addition, an authentication button that will be a trigger for executing the pairing processing may be displayed on the display unit 108 of the information processing apparatus 101. This will allow the user of the information processing apparatus 101 to recognize that the pairing with the communication apparatus 151 can be performed by pressing the authentication button without the input of authentication information. As a result, the user of the information processing apparatus 101 can easily complete the pairing of the information processing apparatus 101 and the communication apparatus 151 without having to check the pairing processing supported by the communication apparatus 151.

Figure 11A:
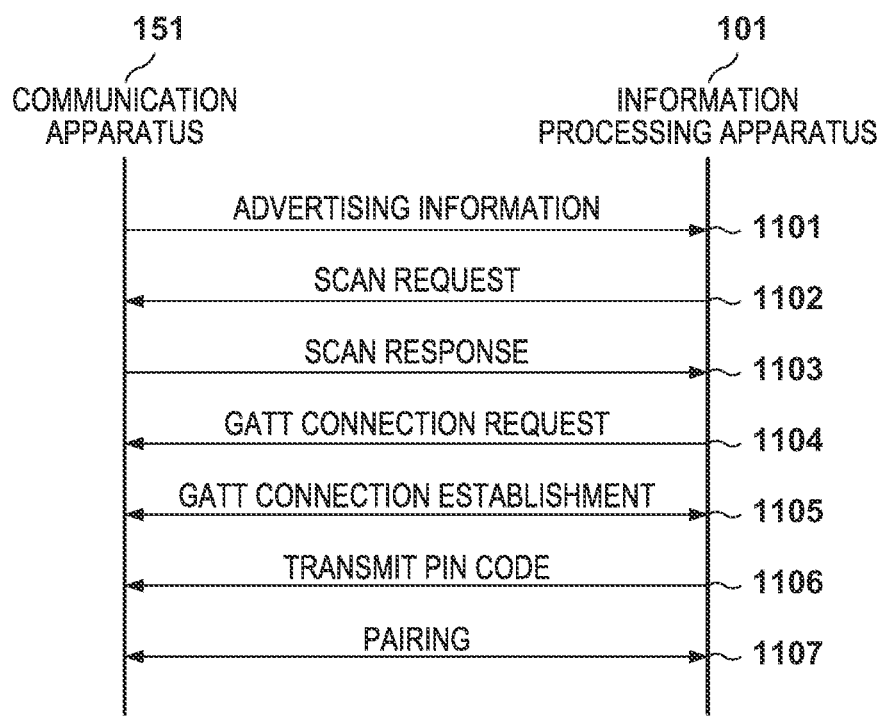
FIGS. 11A and 11B are charts indicating the sequence of processing executed between the information processing apparatus and a communication apparatus.
Figure 11B:
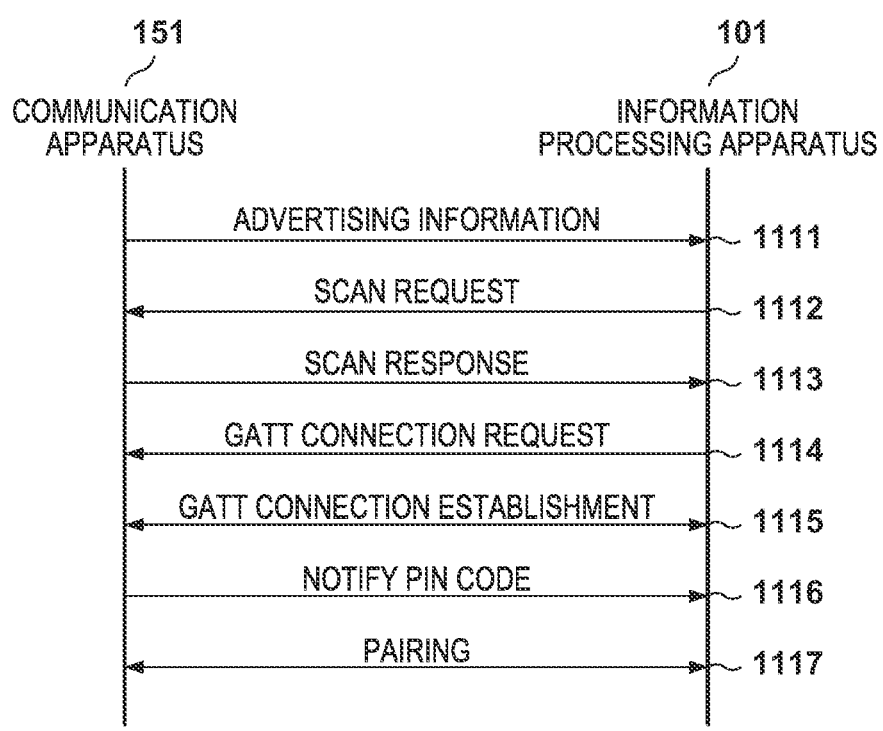

The processing sequence of the information processing apparatus 101 and the communication apparatus 151 will be described next with reference to FIGS. 11A and 11B. FIG. 11A indicates the processing sequence in the case of Numeric Comparison. In this processing, first, the communication apparatus 151 transmits advertising information 1101. Upon receiving this advertising information, the information processing apparatus 101 transmits a scan request 1102. When the scan request has been received, the communication apparatus 151 transmits a scan response 1103. When the scan response is received from the communication apparatus, the information processing apparatus 101 executes the above-described processes of step S702 and subsequent steps. When the communication apparatus is selected in FIG. 8G, the information processing apparatus 101 transmits a GATT connection request 1104 to the communication apparatus. Subsequently, when a GATT connection 1105 is established between the information processing apparatus 101 and the communication apparatus 151, the information processing apparatus 101 transmits a PIN code 1106 input in FIG. 8H. Pairing processing 1107 between the information processing apparatus 101 and the communication apparatus 151 will succeed when the correct PIN code is transmitted. FIG. 11B indicates the processing sequence in the case of Just Works. The processes of reference numerals 1111 to 1113 are similar to the processes of reference numerals 1101 to 1103 of FIG. 11A. When the communication apparatus is selected in FIG. 8E, the information processing apparatus 101 will transmit a GATT connection request 1114 to this communication apparatus. Subsequently, a GATT connection 1115 is established between the information processing apparatus 101 and the communication apparatus 151. The communication apparatus 151 notifies the information processing apparatus 101 of a PIN code 1116 when the authentication button of the communication apparatus is pressed. The information processing apparatus 101 generates a link key based on the PIN code from the notification, and pairing processing 1117 between the information processing apparatus 101 and the communication apparatus 151 will succeed as a result.

According to this embodiment, the information processing apparatus 101 refers to the pairing scheme information and information of the presence/absence of an operation panel included in the scan response information from the communication apparatus 151. The information processing apparatus 101 can switch the pairing scheme in accordance with the pairing scheme information and execute display control processing to cause the display unit 108 to display an appropriate pairing procedure guide in accordance with the presence/absence of the operation panel. As a result, it becomes possible to use one application to perform pairing on a plurality of communication apparatuses that have different pairing methods, and it is possible to assist the user operation necessary for pairing the information processing apparatus 101 and the communication apparatus 151.

Note that although it was described in the above embodiment that the pairing scheme information and the information of the presence/absence of an operation panel included in the scan response information of the communication apparatus 151 will be referred to in the processes of steps S702 to S704, the present invention is not limited to this. For example, the pairing scheme information and the information relating to the presence/absence of an operation panel may be included in the first advertising information from the communication apparatus 151 that is received in step S701. In this case, the processes of steps S702 and S703 can be omitted, and the pairing scheme information and the information of the presence/absence of an operation panel included in the first advertising information can be referred to instead of the scan response information in step S704. This will allow the information processing apparatus 101 to obtain the required information without referring to the second advertising information (scan response), that is, without transmitting a scan request. In addition, the pairing scheme information and the information of the presence/absence of an operation panel may be obtained by GATT communication whose execution is permitted without the pairing. In this case, after the pairing target communication apparatus 151 is selected in step S707, the information processing apparatus 101 can refer to the pairing scheme information and the information of the presence/absence of an operation panel obtained by GATT communication. If it is arranged so that the pairing scheme information and the information of the presence/absence of an operation panel will be transmitted by the second advertising information or GATT communication, the amount of information included in the first advertising information can be reduced. This can prevent wasteful consumption of wireless resources due to unnecessary information being transmitted in a state without the transmission of the scan request.

As described above, in this embodiment, pairing is performed by using a different pairing scheme in accordance with the contents of the scan response. More specifically, a case in which the pairing scheme to be used is determined based on the pairing scheme information included in the scan response information in step S708 has been described. However, the present invention is not limited to this, and it may be determined that a specific pairing scheme will be used based on the fact that the pairing scheme information is not included in the scan response information in step S708.

Alternatively, the pairing scheme may be determined based on the presence/absence of the pairing scheme information and the combination of the contents in a case in which the pairing scheme information is included. For example, assume that a printing apparatus A that does not transmit the pairing scheme information and performs pairing by the Numeric Comparison scheme is present. Furthermore, assume that a printing apparatus B and a printing apparatus C that support Just Works and Passkey Entry, respectively, and transmit pairing scheme information are present. That is, it may be set so that, for example, the pairing scheme information will not be transmitted when the Numeric Comparison scheme is to be used but will be transmitted when other schemes are to be used. In a case in which one of the other schemes (for example, Just Works and Passkey Entry) is to be used, the notification of the scheme to be used will be transmitted by using the pairing scheme information. In this case, the printing apparatus A, the printing apparatus B, and the printing apparatus C are discriminated appropriately by making a determination based on the presence/absence of the pairing scheme information and the combination of the contents of the pairing scheme information, and thus an appropriate pairing scheme corresponding to each apparatus can be used.

In addition, the information processing apparatus 101 can hold a whitelist listing the corresponding device type for each pairing scheme that has been provided in a form that can be referred by the printing application. In this case, the information processing apparatus 101 can obtain the model information instead of the pairing scheme information and determine the pairing scheme by collating the model information and the whitelist. Furthermore, although pairing is executed by two different types of pairing schemes in the embodiment described above, one of these two types of pairing schemes may be replaced with a setting for "no authentication" (no pairing). Also, although it has been described that the guide to be displayed will be switched in accordance with whether the communication apparatus includes a panel, the guide to be displayed may be switched based on another standard. For example, the process of step S710 may be executed when the size of the panel included in the communication apparatus 151 is equal to or larger than a predetermined size, and the process of step S711 may be executed when the size of the panel included in the communication apparatus 151 is smaller than the predetermined size. Also, whether to execute the process of step S710 or step S711 may be determined by another piece of information of the communication apparatus.

Note that although the embodiment describes an example using BLE as the short range wireless communication scheme, another short range wireless communication scheme may be used. In this case, if there are plurality of authentication schemes available for the other short range wireless communication scheme, the authentication scheme to be used in accordance with the characteristics of the communication apparatus can be determined, and guide information for performing authentication by the determined authentication scheme can be presented. In addition, although wireless LAN setting communication for exchanging setting parameters for wireless LAN communication can be performed by short range wireless communication, the present invention is not limited to this. Arbitrary pieces of information can be transmitted/received by short range wireless communication. That is, the method described above can be executed in an apparatus that has only the short range wireless communication function as its communication function.

In addition, the above embodiment described an example in which the information processing apparatus 101 presents the information related to the procedure of the pairing performed between the self-apparatus and the pairing target communication apparatus 151. However, the present invention is not limited to this. For example, the information processing apparatus 101 may operate to present the procedure of pairing with another apparatus which is present in its periphery (present within the communicable range of the short range wireless communication unit 110) regardless of whether the self-apparatus is to perform the pairing. As a result, when the user wants to know the pairing procedure of one of the communication apparatus, the user can recognize the pairing procedure of this communication apparatus by moving the user's information processing apparatus 101 to the vicinity of this communication apparatus.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113846, filed Jun. 14, 2018, which is hereby incorporated by reference herein in its entirety.

What is claimed is:

1. A control method of an information processing apparatus that can execute authentication processing with a communication apparatus by a plurality of authentication schemes, wherein the plurality of authentication schemes includes a first scheme for performing the authentication processing when predetermined authentication information is inputted in the information processing apparatus and a second scheme for performing the authentication processing without input of the predetermined authentication information in the information processing apparatus, the method comprising:

performing display control to cause a display unit to display a guide screen, indicating user operation for at least one of the information processing apparatus and the communication apparatus, for performing the authentication processing with the communication apparatus, wherein the guide screen is displayed in a case that the authentication scheme supported by the communication apparatus that is a target of the authentication processing is the first scheme and in a case that the authentication scheme supported by the communication apparatus that is the target of the authentication processing is the second scheme, and display contents of the guide screen differ depending on whether the authentication scheme supported by the communication apparatus that is the target of the authentication processing is the first scheme or the second scheme;

performing, in a case where the authentication scheme supported by the communication apparatus is the first scheme, a second control for displaying a screen for accepting input of the predetermined authentication information after displaying the guide screen by the display control; and executing the authentication processing in accordance with an operation performed by a user after the guide is displayed by a control performed in the performing the display control, wherein in the executing, the authentication processing with the communication apparatus is executed in accordance with an authentication scheme, among the plurality of authentication schemes, that is an authentication scheme corresponding to the communication apparatus that is a target of the authentication processing and corresponds to the displayed guide.

2. The method according to claim 1, wherein the method further includes obtaining information from the communication apparatus, the operation by the user includes an operation performed on the communication apparatus, the information obtained by the information processing apparatus includes capability information related to an information presentation capability of the communication apparatus, and in a case in which the obtained information corresponds to a predetermined authentication scheme among the plurality of authentication schemes, control is performed for displaying a different guide screen on the display unit in accordance with the capability information in the performing the display control.

3. The method according to claim 1, wherein in the performing the display control, in a case in which the authentication scheme supported by the communication apparatus is the first scheme and the communication apparatus includes a screen configured to display authentication information, control for displaying a guide screen, indicating that the authentication information displayed on the screen by the communication apparatus is to be input to the information processing apparatus, on the display unit is performed.

4. The method according to claim 3, wherein in the performing the display control, in a case in which the authentication scheme supported by the communication apparatus is the first scheme, the communication apparatus is a printer and the communication apparatus does not have the screen configured to display the authentication information, control for displaying a guide screen, indicating that the authentication information printed by the communication apparatus is to be input to the information processing apparatus, on the display unit is performed.

5. The method according to claim 1, further including obtaining information from the communication apparatus via predetermined communication, wherein display contents of the guide screen differ depending on the obtained information, and the predetermined communication is communication in accordance with Bluetooth® Low Energy (BLE).

6. The method according to claim 5, wherein the communication apparatus transmits advertising information,
the information processing apparatus transmits a scan request in response to receiving the advertising information,
the communication apparatus transmits a scan response in response to receiving the scan request, and
the obtained information is included in the scan response.

7. The method according to claim 5, wherein the authentication processing is pairing processing in the BLE.

8. The method according to claim 5, wherein the obtained information is included in advertising information transmitted from the communication apparatus.

9. The method according to claim 1, wherein the obtained information includes scheme information indicating an authentication scheme supported by the communication apparatus, and the authentication processing with the communication apparatus is executed in the executing in accordance with the authentication scheme indicated by the scheme information.

10. The method according to claim 1, further including obtaining information from the communication apparatus, wherein in the executing, the authentication processing with the communication apparatus is executed in accordance with a different authentication scheme depending on whether scheme information indicating an authentication scheme supported by the communication apparatus is included in the obtained information.

11. An information processing apparatus that can execute authentication processing with a communication apparatus by a plurality of authentication schemes, wherein the plurality of authentication schemes includes a first scheme for performing the authentication processing when predetermined authentication information is inputted in the information processing apparatus and a second scheme for performing the authentication processing without input of the predetermined authentication information in the information processing apparatus, the apparatus comprising:
at least one memory that stores a set of instructions; and
at least one processor that executes the set of instructions to:
perform display control to cause a display unit to display a guide screen, indicating user operation for at least one of the information processing apparatus and the communication apparatus for performing the authentication processing with the communication apparatus, wherein the guide screen is displayed in a case that the authentication scheme supported by the communication apparatus that is a target of the authentication processing is the first scheme and in a case that the authentication scheme supported by the communication apparatus that is the target of the authentication processing is the second scheme, and display contents of the guide screen differ depending on whether the authentication scheme supported by the communication apparatus that is the target of the authentication processing is the first scheme or the second scheme;
perform, in a case where the authentication scheme supported by the communication apparatus is the first scheme, a second control for displaying a screen for accepting input of the predetermined authentication information after displaying the guide screen by the display control; and
execute the authentication processing in accordance with an operation performed by a user after the guide is displayed by the display control,
wherein the authentication processing with the communication apparatus is executed in accordance with an authentication scheme, among the plurality of authentication schemes, that is an authentication scheme corresponding to the communication apparatus that is the target of the authentication processing and corresponds to the displayed guide.

12. The apparatus according to claim 11, wherein the at least one processor further executes the set of instructions to:
obtain information from the communication apparatus,
wherein the operation performed by the user includes an operation performed on the communication apparatus,
the information obtained by the information processing apparatus includes capability information related to an information presentation capability of the communication apparatus, and
in a case in which the obtained information corresponds to a predetermined authentication scheme among the plurality of authentication schemes, a different guide screen is displayed on the display unit in accordance with the capability information.

13. The apparatus according to claim 12, wherein in a case in which the authentication scheme supported by the communication apparatus is the first scheme and the communication apparatus includes a screen configured to display authentication information, the display unit displays a guide screen indicating that the authentication information displayed on the screen by the communication apparatus is to be input to the information processing apparatus.

14. The apparatus according to claim 13, wherein in a case in which the authentication scheme supported by the communication apparatus is the first scheme, the communication apparatus is a printer and the communication apparatus does not have the screen configured to display the authentication information, the display unit displays a guide screen indicating that the authentication information printed by the communication apparatus is to be input to the information processing apparatus.

15. The apparatus according to claim 11, wherein the at least one processor further executes the set of instructions to obtain information from the communication apparatus via predetermined communication, display contents of the guide screen differ depending on the obtained information, and the predetermined communication is communication in accordance with Bluetooth® Low Energy (BLE).

16. The apparatus according to claim 15, wherein the communication apparatus transmits advertising information,
    the information processing apparatus transmits a scan request in response to receiving the advertising information,
    the communication apparatus transmits a scan response in response to receiving the scan request, and
    the obtained information is included in the scan response.

17. The apparatus according to claim 15, wherein the authentication processing is pairing processing in the BLE.

18. The apparatus according to claim 15, wherein the obtained information is included in advertising information transmitted from the communication apparatus.

19. The apparatus according to claim 11, wherein the obtained information includes scheme information indicating an authentication scheme supported by the communication apparatus, and the execution unit executes the authentication processing with the communication apparatus in accordance with the authentication scheme indicated by the scheme information.

20. The apparatus according to claim 11, wherein the at least one processor further executes the set of instructions to obtain information from the communication apparatus and the authentication processing with the communication apparatus is executed in accordance with a different authentication scheme depending on whether scheme information indicating an authentication scheme supported by the communication apparatus is included in the obtained information.

21. A non-transitory computer-readable storage medium storing instructions for causing a computer to execute a method, wherein the plurality of authentication schemes includes a first scheme for performing the authentication processing when predetermined authentication information is inputted in the information processing apparatus and a second scheme for performing the authentication processing without input of the predetermined authentication information in the information processing apparatus, the method comprising:
    performing display control to cause a display unit to display a guide screen, indicating user operation for at least one of the information processing apparatus and the communication apparatus, for performing the authentication processing with the communication apparatus, wherein the guide screen is displayed in a case that the authentication scheme supported by the communication apparatus that is a target of the authentication processing is the first scheme and in a case that the authentication scheme supported by the communication apparatus that is the target of the authentication processing is the second scheme, and display contents of the guide screen differ depending on whether the authentication scheme supported by the communication apparatus that is the target of the authentication processing is the first scheme or the second scheme;
    performing, in a case where the authentication scheme supported by the communication apparatus is the first scheme, a second control for displaying a screen for accepting input of the predetermined authentication information after displaying the guide screen by the display control; and
    executing the authentication processing in accordance with an operation performed by a user after the guide is displayed by a control performed in the performing the display control,
    wherein
    in the executing, the authentication processing with the communication apparatus is executed in accordance with an authentication scheme, among the plurality of authentication schemes, that is an authentication scheme corresponding to the communication apparatus that is a target of the authentication processing and corresponds to the displayed guide.

* * * * *